United States Patent
Xie et al.

(10) Patent No.: US 12,376,024 B2
(45) Date of Patent: Jul. 29, 2025

(54) METHOD FOR BROADCAST RADIO COMMUNICATION SERVICES

(71) Applicant: ZTE Corporation, Guangdong (CN)

(72) Inventors: Feng Xie, Guangdong (CN); Wei Luo, Guangdong (CN)

(73) Assignee: ZTE Corporation, Shenzhen (CN)

( * ) Notice: Subject to any disclaimer, the term of this patent is extended or adjusted under 35 U.S.C. 154(b) by 398 days.

(21) Appl. No.: 18/062,856

(22) Filed: Dec. 7, 2022

(65) Prior Publication Data

US 2023/0095886 A1 Mar. 30, 2023

Related U.S. Application Data

(63) Continuation of application No. PCT/CN2020/097988, filed on Jun. 24, 2020.

(51) Int. Cl.
*H04W 48/18* (2009.01)
*H04W 48/10* (2009.01)

(52) U.S. Cl.
CPC ........... *H04W 48/18* (2013.01); *H04W 48/10* (2013.01)

(58) Field of Classification Search
CPC .................................................. H04W 48/18
USPC ....................................................... 455/434
See application file for complete search history.

(56) References Cited

U.S. PATENT DOCUMENTS

2018/0091465 A1* 3/2018 Faaborg ................. H04L 51/04
2018/0262979 A1* 9/2018 Wang .................... H04W 48/18

FOREIGN PATENT DOCUMENTS

| CN | 101483904 A | 7/2009 |
|---|---|---|
| CN | 109618413 A | 4/2019 |
| EP | 3367730 A1 | 8/2018 |
| EP | 3 550 892 | 10/2019 |
| KR | 20190108371 A | 9/2019 |
| WO | WO 2014/143321 A1 | 9/2014 |
| WO | WO 2017/110109 A1 | 6/2017 |
| WO | WO 2017/143047 | 8/2017 |
| WO | WO 2017/160109 | 9/2017 |
| WO | WO 2019/154001 A1 | 8/2019 |

OTHER PUBLICATIONS

International Search Report mailed Mar. 15, 2021 for International Application No. PCT/CN2020/097988.
Written Opinion mailed Mar. 15, 2021 for International Application No. PCT/CN2020/097988.
Extended European Search Report issued May 23, 2023 in corresponding European Patent Application No. 209423128.

(Continued)

*Primary Examiner* — Qutbuddin Ghulamali
(74) *Attorney, Agent, or Firm* — Crowell & Moring LLP

(57) ABSTRACT

This disclosure relates to methods and devices for broadcasting network service capability announcement messages by network nodes or functions in a wireless communication system. The broadcast announcement message includes a network service identity list. The network service identity list includes types of network services provided by a network node or function and various service entities providing the services, and network resource sets associated with the network services. Another network node or function may request one or more of the network services according to the network service capability announcement message.

16 Claims, 4 Drawing Sheets

(56) References Cited

OTHER PUBLICATIONS

Chinese First Office Action for corresponding application no. CN202080101664.0 issued Jul. 11, 2024, including English translation (31 pages).
ZTE, vivo, "KI #1,2 Sol #22: Update to Remove ENs", SA WG2 Meeting #139E (e-meeting), S2-2004725, Jun. 1, 2020 (3 pages).

* cited by examiner

METHOD FOR BROADCAST RADIO COMMUNICATION SERVICES

CROSS REFERENCE

This application is a continuation of and claims priority to International Patent Application No. PCT/CN2020/097988, filed Jun. 24, 2020, which is herein incorporated by reference in its entirety.

TECHNICAL FIELD

This disclosure is directed generally to wireless communications and particularly to transmitting and receiving broadcast information of wireless communication services by wireless network nodes.

BACKGROUND

Mobile communication technologies are providing the world with increasing network connectivity. The rapid technological advances in mobile networks have in turn led to greater demands for network capacity and bandwidth. It is important to design an efficient mobile network architecture with interacting network nodes that are flexibly deployed and scalable in provide various network services. Other aspects, such as energy consumption, device cost, spectral efficiency, and latency are also important consideration when designing a mobile network to meet the needs of various communication applications.

SUMMARY

This disclosure is directed to methods, systems, and devices related to wireless communication, and more specifically, to transmitting and receiving broadcast of information of wireless communication services by wireless network nodes or functions.

In one embodiment, a method for obtaining a network service by a network function is disclosed. The method includes receiving an network service announcement message from a first serving network function, wherein the network service announcement message comprises a service identity list of one or more network services provided by a second serving network function; and selecting a target network service from the one or more network services.

The method above may further include transmitting a service request for obtaining the selected target network service to the first serving network function based on the network service announcement message.

In any one of the methods above, the first serving network function are a same network function as the second serving network function. In any one of the methods above, the service identity list may include a service type for each of the one or more network services. In any one of the methods above, the service type comprises one of paging, multimedia broadcast multicast, network registration request, network configuration request, network connection request, network registration response, network connection response, announcement and discovery request, or announcement and discovery response service type.

In any one of the methods above, the service identity list further comprises a service entity for each of the one or more network services. In any one of the methods above, the service entity comprises one of a public land mobile network identity, an authentication management function identifier, a single network slice selection assistance information, or a communication node identity associated with each of the one or more network services.

In any one of the methods above, the service identity list further comprises at least one network resource set for each of the one or more network services. Any one of the methods above may further include transmitting a service request for obtaining the selected target network service to the first serving network function by selecting network resources from the network resource sets corresponding to the selected target network service in the service identity list and transmitting the service request using the selected network resources.

Various devices are further disclosed. Each of these devices includes a processor and a memory, wherein the processor is configured to read computer code from the memory to implement any one of the methods above. In any one of the methods above, the service identity list further comprises a resource type indicator for each of the at least one network resource set. In any one of the methods above, the resource type indicator indicates one of physical channel/signal, spectrum/frame/power, or business operation resource type.

In any one of the methods above, the network service announcement message is transmitted via one or more system information blocks. Any one of the methods above may further include transmitting a service request for obtaining the selected target network service to the first serving network function based on the network service announcement message via a service-based interface between network functions.

In another embodiment, a method for announcing network services by a serving network function is disclosed. The method may include constructing a first network service announcement message comprising a service identity list of one or more network services provided by the serving network function; broadcasting the first network service announcement message to other network functions; and receiving a service request for a target network service among the one or more network services transmitted by a served network function after the served network function receives the broadcasted first network service announcement message.

In the method above, the service identity list may include a service type for each of the one or more network services. In any one of the methods above, the service type comprises one of paging, multimedia broadcast multicast, network registration request, network configuration request, network connection request, network registration response, network connection response, announcement and discovery request, or announcement and discovery response service type.

In any one of the methods above, the service identity list comprises a service type for each of the one or more network services. In any one of the methods above, the service type comprises one of paging, multimedia broadcast multicast, network registration request, network configuration request, network connection request, network registration response, network connection response, announcement and discovery request, or announcement and discovery response service type.

In any one of the methods above, the service identity list further comprises a service entity for each of the one or more network services. In any one of the methods above, the service entity comprises one of a public land mobile network identity, an authentication management function identifier, a single network slice selection assistance information, or a communication node identity associated with each of the one or more network services.

In any one of the methods above, the service identity list further comprises at least one network resource set for each of the one or more network services. In any one of the methods above, receiving the service request from the served network function may include receiving the service request for the target network service in network resources selected by the served network function from the network resource sets corresponding to the target network service according the service identity list. In any of the methods above, the service identity list further comprises a resource type indicator for each of the at least one network resource set. In any one of the methods above, the resource type indicator indicates one of physical channel/signal, spectrum/frame/power, or business operation resource type.

In any one of the methods above, the first network service announcement message is transmitted via one or more system information blocks by the serving network function. In any one of the methods above, the service request is transmitted via a service-based interface between network functions.

In any one of the methods above, the serving network function further receives a second network service announcement message from another serving network function prior to constructing the first network service announcement message. In any one of the methods above, the second network service announcement message may include one of a service identity list indicating types or service identities of one or more network services provided by the other serving network function, a service identity list indicating types or service identities of one or more network services not provided by the other serving network function, a service identity add-list indicating types or service identities of one or more network services to be added as network services that are provided by the other serving network function, or a service identity release-list indicating types or service identities of one or more network services to be removed as network service that were provided by the other serving network function.

In any one of the methods above, contents of the first network service announcement message and the second network service announcement message are the same.

Network devices are further disclosed. Each of the network devices includes processors and memories with computer instructions stored therein. The processors, when executing the computer instructions from the memories, are configured to implement any one of the methods above.

Computer-readable media are further disclosed. Each of the computer-readable media includes instructions which, when executed by a computer, cause the computer to carry out any one of the methods above.

The above and other aspects and their implementations are described in greater detail in the drawings, the descriptions, and the claims below.

DETAILED DESCRIPTION

Figure 1:
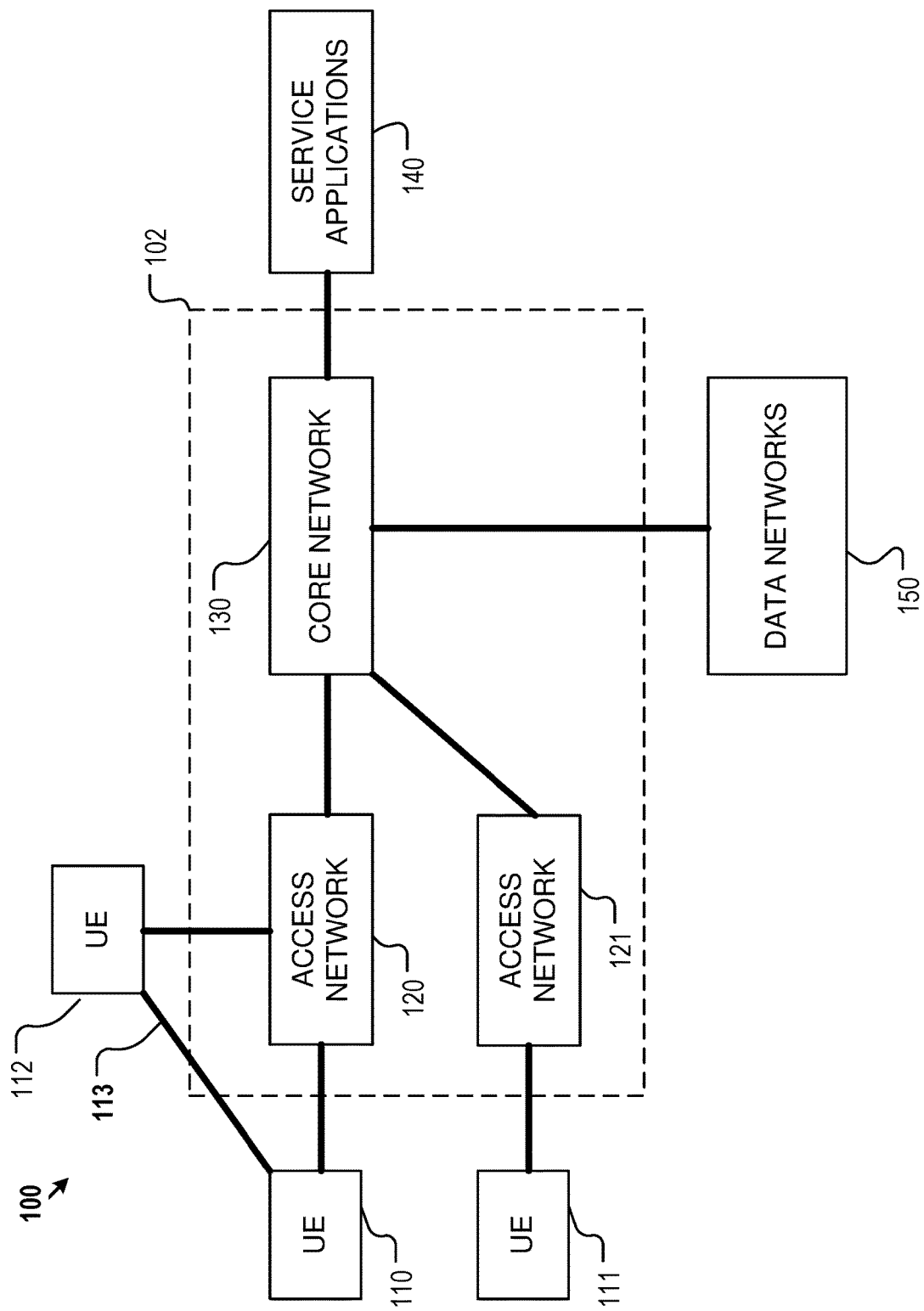
FIG. 1 illustrates an example mobile network including wireless access networks and a core network.

The technology and examples of implementations and/or embodiments in this disclosure can be used to improve performance in providing various system services in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. The disclosed implementations may be further embodied in a variety of different forms and, therefore, the scope of this disclosure or claimed subject matter is intended to be construed as not being limited to any of the embodiments set forth below. The various implementations may be embodied as methods, devices, components, systems, or non-transitory computer readable media. Accordingly, embodiments of this disclosure may, for example, take the form of hardware, software, firmware or any combination thereof.

This disclosure is directed to methods, systems, and devices related to wireless communication, and more specifically, to transmitting and receiving broadcast information of wireless communication services by wireless network nodes for the purposes of moving towards a modular architecture for requesting and providing network services. While this disclosure provides example implementations in a 5G cellular network system, the underlying principles are applicable to other generations of cellular network systems and other general wireless network systems.

INTRODUCTION

Services and network functions provided by a wireless system have becoming increasingly complex and diverse in order to support growing number and types of wireless mobile or fixed devices and growing demands for higher communication bandwidth/throughput and lower latency. These network services and functions have evolved from merely providing an inter-person communication platform to becoming an integral part of communities and enterprises in various industries.

Because of the increasing complexity, wireless network nodes and components have become more sophisticated. Accordingly, the deployment, operation and maintenance of software and hardware of these network nodes and components have also become increasingly challenging and costly.

To improve the flexibility/scalability and reduce deployment and maintenance complexity of a wireless network system, the various network services and network functions provided by or through the access network portion of the wireless network may be treated in a modular fashion and as service entities within each wireless network nodes. Various example implementations of such a modular approach to wireless network services and functions are described in more detail in the PCT International Application No. PCT/CN2019/198040, entitled "Service-Based Access Network Architecture and Communication" and filed with the Chinese National Intellectual Property Administration by the same Applicant as this current application on Sep. 26, 2019, the entirety of which is herein incorporated by reference.

Wireless Network Overview

An example wireless communication network, shown as 100 in FIG. 1, may include user equipment (UE) 110, 111, and 112, a carrier network 102, various service applications 140, and other data networks 150. The carrier network 102, for example, may include access networks 120 and 121, and a core network 130. The carrier network 110 may be configured to transmit voice, data, and other information (collectively referred to as data traffic) among UEs 110, 111, and 112, between the UEs and the service applications 140, or between the UEs and the other data networks 150. The Access networks 120 and 121 may be configured as various wireless access network nodes (WANNs) to interact with the UEs on one side of a communication session and the core network 130 on the other. The core network 130 may include various network nodes configured to control communication sessions and perform network access management and traffic routing. The service applications 140 may be hosted by various application servers deployed outside of but connected to the core network 130. Likewise, the other data networks 150 may also be connected to the core network 130.

In the wireless communication network of 100, the UEs may communicate with one another via the access network. For example, UE 110 and 112 may be connected to and communicate via the same access network 120. The UEs may communicate with one another via both the access networks and the core network. For example, UE 110 may be connected to the access network 120 whereas UE 111 may be connected to the access network 121, and as such, the UE 110 and UE 111 may communicate to one another via the access network 120 and 121, and the core network 130. The UEs may further communicate with the service applications 140 and the data networks 150 via the core network 130. Further, the UEs may communicate to one another directly via side link communications, as shown by 113.

Figure 2:
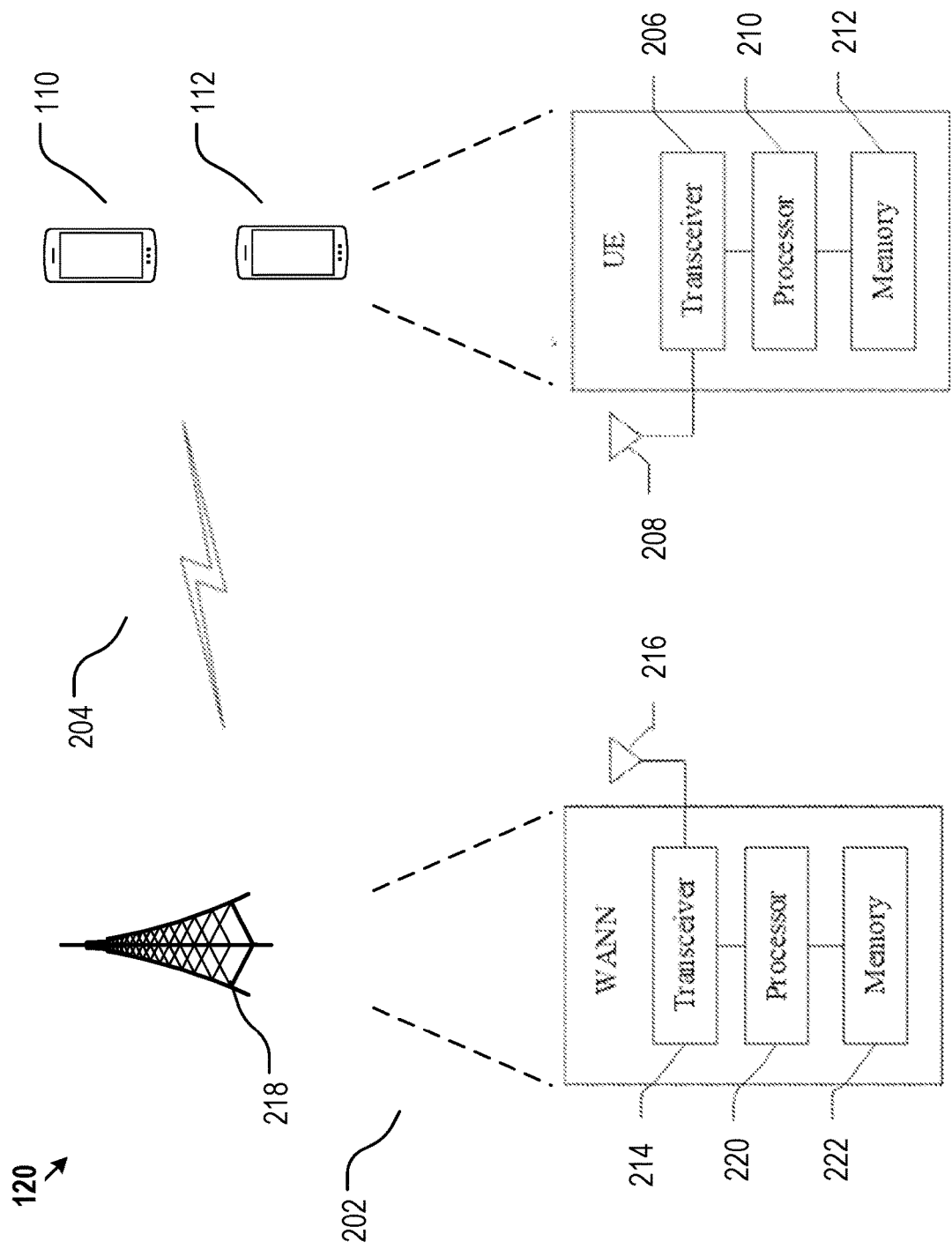
FIG. 2 illustrates an example wireless access network.

FIG. 2 further shows an example system diagram of the wireless access network 120 including a wireless access network node (WANN) 202 serving UEs 110 and 112 via the over-the-air interface 204. Each of the UEs 110 and 112 may include but is not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network. As shown in FIG. 2, each of the UEs such as UE 112 may include transceiver circuitry 206 coupled to an antenna 208 to effectuate wireless communication with the WANN 120 or with another UE such as UE 110. The transceiver circuitry 206 may also be coupled to a processor 210, which may also be coupled to a memory 212 or other storage devices. The memory 212 may store therein computer instructions or code which, when read and executed by the processor 210, cause the processor 210 to implement various ones of the methods described herein. In particular, the UEs may be configured to receive or provide network services.

Similarly, the WANN 120 may include a base station or other wireless network access points capable of communicating wirelessly via the over-the-air interface 204 with one or more UEs and communicating with the core network. For example, the WANN 120 may be implemented in the form of a 4G LTE base station, a 5G NR base station, a 5G central-unit base station, or a 5G distributed-unit base station. Each type of these WANNs may be configured to perform a corresponding set of wireless network functions. The WANN 120 may include transceiver circuitry 214 coupled to an antenna 216, which may include an antenna tower 218 in various forms, to effectuate wireless communications with the UEs 110 and 112. The transceiver circuitry 214 may be coupled to one or more processors 220, which may further be coupled to a memory 222 or other storage devices. The memory 222 may store therein instructions or code that, when read and executed by the processor 220, cause the processor 220 to implement various functions of the WANN 120 described herein. In particular, the WANN 120 may be configured to receive or provide network services to or from other network nodes of the wireless network.

Service-Based Interface for Network Services and Functions

As described in more detail in the PCT International Application No. PCT/CN2019/198040 herein incorporated by reference, the various network services and functions may be implemented as network service entities in a plurality of domains, including but not limited a cell group (CG) domain, a radio connection (RC) domain, and a radio session (RS) domain.

The CG domain may be responsible for services relating to a cell group, and the services can be either related or unrelated to a UE. Examples of CG domain services may include but are not limited to CG enforcement functions, CG control and enforcement proxy functions, CG control functions, CG data plane functions; CG management functions, CG exposure functions, and CG intelligence functions.

The RS domain may be unrelated to the cell group and responsible for radio session and bearer connection functions that may or may not be related to the UEs. Examples of RS domain services include but are not limited to RS service data adaptation protocol (SDAP) functions or packet data convergence protocol (PDCP) functions, RS control and enforcement proxy functions, RS domain control functions, RS data plane functions, RS management plane functions, RS exposure functions, RS intelligence functions.

The RC domain may be unrelated to the cell group and responsible for radio connectivity functions that may or may not be related to the UEs. Examples of RC domain services include but are not limited to RC control functions, RC data plane functions, RC management plane functions, and RC intelligence functions.

The various control functions in a particular domain may provide a service-based interface, such as an application programming interface (API) for other control functions (e.g., control functions in the particular domain and other domains). Accordingly, the CG, RC, and RS domains may use other services provided in any of the domains via the service-based interface. In some implementations, the service-based interface may support request and response messages for service requests. For example, the service-based interface may support the transmission of a CG control request message from an RC control function to a CG control function and corresponding response message from the CG control function to the RC control function. The CG control request and response messages may include UE-specific information and/or control-function specific information. The control function of each domain may control an enforcement function of the domain through a proxy function between the control function and the enforcement function using similar service-based interfaces supporting service request and response messages.

The service-based interface may be further implemented for network services and functions request and response between network nodes of the access network and the network nodes of the core network. For example, the interactions between the RC control functions and Authentication management Function (AFM) of a 5G core network and between the RS control functions and the Session Management Function (SMF) of the 5G core network may be facilitated by the service-based interface described above. In a particular example, an AMF can call the service-based interface provided by an RC control function for a service request. Likewise, an RC control function can also call a corresponding AMF service-based interface to support access, authentication, mobility, NAS messaging, etc. As such, the service-based interface may be expanded and implemented beyond the access network into the core network for requesting relevant services.

Each of the network services may be associated with various types of network resources that are needed for providing the network service. These resources may be pre-configured or dynamically allocated.

A network node may be configured with the service-based interface to provide one or more network services to other network nodes. Such network service functions or capabilities must be made know to the other network nodes before the other network nodes can make service request. As shown in the various embodiments below, a network node that offers one or more network services may be configured to announce its service capability and network resource allocation for requesting the services via broadcast messages. Such a broadcast message may contain sufficient information to enable other network nodes to make a service request via the service-based interface.

The term "node" or "network node" may refer to a physical network unit or a network function. A network function may resides in a single physical network unit. Alternatively a network function may resides in or provided by two or more physical network unit. A physical network unit may provide or support one or more network functions. In the various implementations below, the terms "network node" and "network function" are interchangeable unless explicitly distinguished.

The terms "served node", "served network node", or "serviced network function" is used to refer to a network node or function that requests a network service via the service-based interface, whereas the term "serving node", "serving network node", or "serving network function" is used to refer to a network node or function that provides the requested network service. A served node or a serving node may include any one of a WANN (e.g., a base station), a UE, or other network nodes. A serving node may additionally include other networks, such as the service application 140 and the data networks 150 of FIG. 1. A served node or serving node may be a physical network node. Alternatively, a served node or serving node may be a functional component within a physical network node. In some other implementations, a served node or serving node may be a functional network component distributed in multiple physical network nodes.

First Embodiment (Served Node)

A serving network node may transmit broadcast messages to other network nodes to announce its service functions or capabilities. Such a broadcast message may be used to inform other network nodes the various network services that are provided by the serving network node. Correspondingly, the other network nodes, functioning as served network nodes, may receive the announcement and obtain various information with respect to the services provided by the serving nodes.

As an example, a network service announcement message broadcasted by the serving network node and received by a served node may include at least one of:
(1). A service identity list indicating service types the serving node can provide or support;
(2). The service identity list indicating service types along with service entities the serving node can provide or support; or
(3). The resource set for each service identity.

Further, a service type included in the announcement message for a service may indicate at least one network service category among a plurality of network service categories. In some implementations, the plurality of network service categories may include but are not limited to paging service, multimedia broadcast multicast service (MBMS), network registration request service; network configuration request service; network connection request service, network registration response service, network configuration response service, network connection response service, announcement and discovery request service, and announcement and discovery response service.

The service entity information may be used to indicate identity information of the mobile network and the network node providing the network service. For example, the service entity information associated with a network service may include at least one of: a public land mobile network (PLMN) identity, an AMF identifier, a single network slice selection assistance information (S-NSSAI, which may consist of slice/service type), and a communication node identity.

The resource set component of the network service announcement by the serving node may include information related to network resources that are allocated or allocable for the corresponding network services. The network resources for various network services may include resources at various resource levels or network layers. Accordingly, the resource sets for various network services may be classified into multiple types of resource sets, labeled as, for example, TYPE 1 resource sets, TYPE 2 resource sets, TYPE 3 resource sets, and so on. A particular service may be associated with one or more of the TYPE 1, TYPE 2, and/or TYPE 3 resource sets.

A TYPE 1 resource set, for example, may include physical channel/signal resource set such as synchronous signal (SS) resource set and physical downlink shared channel (PDSCH) resource set. A TYPE 2 resource set may include an RF service related resource set such as radio spectrum, frame structure, and radio power. A TYPE 3 resource set may include a business operation resource set such as PLMN identity, AMF identifier, and S-NSSAI. The terms "TYPE 1", "TYPE 2," and "TYPE 3" are used merely as labels to differentiate the resource sets of different types or levels.

A serving network node may provide multiple categories of services. As such, the network service announcement message may include a list of multiple service identities and each service identity may be associated with a service entity and one or more resource sets of various types.

Once the network service announcement message from the serving network node is received by the served network nodes, the served network node, when needing a particular network service, may then select from resource sets for the particular network service according to the received announcement message and request the particular network service from the serving network node. The network service request, for example, may be made via the service-based interface described above.

The served nodes may be a UE, a WANN (a base station) or another type of network node in the wireless network. The serving node, for example, may be a UE, a WANN, a service application, a data network, or another type of network node in the wireless network. For example, the served network may be a UE. Upon receiving a network service announcement message broadcasted by a serving node, the UE may select from the network resource sets according to the announcement message to send a registration request for invoking a network registration service via the service-based interface to the serving network node. For another example, the UE may select from the network resource sets according to the announcement message to send a configuration request via the service-based interface to the serving network node. Likewise, the UE may select from the network resource sets according to the announcement message to send a network connection request via the service-based interface to the serving network node.

Second Embodiment (Network Service Resource Specification)

The resource sets for the each network service announced by the serving network node described above may be specified either as actually specified sets of network link control channel (PDCCH) resources 332, secondary synchronization signal (SSS) resources 334. For another example, a TYPE 2 resource set 322 may be associated with carrier resources 336, frequency band resources 338, and power resources 340. For yet another example, TYPE 3 resource set 324 may be associated with PLMN identity 342, AMF identifier 344, and S-NSSAI 346. The different resource set identifiers of different resource types can identify different resources.

An example network service announcement message specifying resource sets associated with various services provided by a serving node is shown below.

```
Announcement
{
   Service identity;
   TYPE1 resource set ID;
   TYPE2 resource set ID;
   TYPE3 resource set ID;
   ooo
}
TYPE1ResourceSetList: SEQUENCE (SIZE (1..maxNrofTYPE1ResourceSet)) OF
TYPE1ResourceSet
TYPE1 resource set
{
   resource set ID;
   SS resource set;
   SSB resource set;
   Beam resource set;
   PDCCH resource set;
   Physical Cell Identity list;
   Channel State Information Reference Signal(CSI-RS )resource list
   ......
}
TYPE2ResourceSetList: SEQUENCE (SIZE (1..maxNrofTYPE1ResourceSet)) OF
Type2ResourceSet
TYPE2 resource set
{
   resource set ID;
   Band set ID;
   Power resource set;
   carrier resource set;
   Layer 3 Cell Identity list;
   ......
}
TYPE3ResourceSetList: SEQUENCE (SIZE (1..maxNrofTYPE1ResourceSet)) OF
Type3ResourceSet
TYPE3 resource set
{
   resource set ID;
   PLMN Identity;
   AMF Identifier;
   S-NSSAI which consists of Slice/Service Type;
   ......
}
``` resources or resource pools from which network resources may be dynamically selected by the served network node for requesting the network service.

Figure 3:
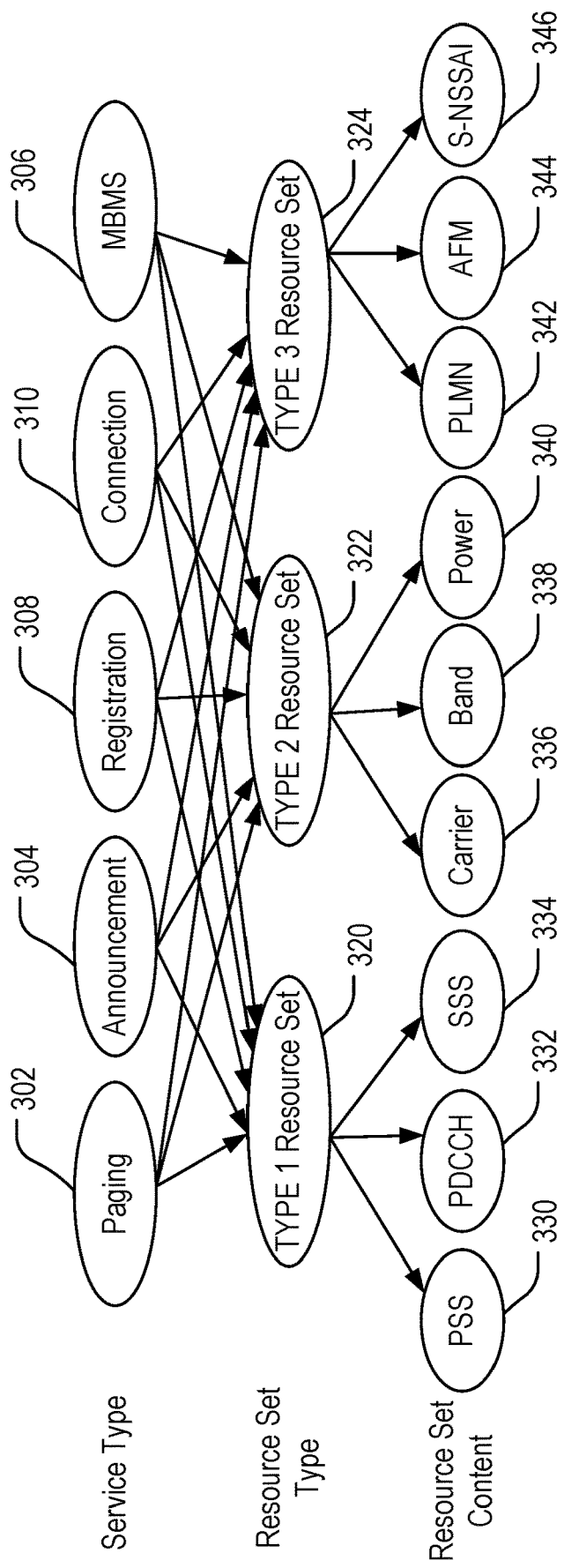
FIG. 3 shows an example scheme for specifying network resources for providing various types of network services.
Figure 4:
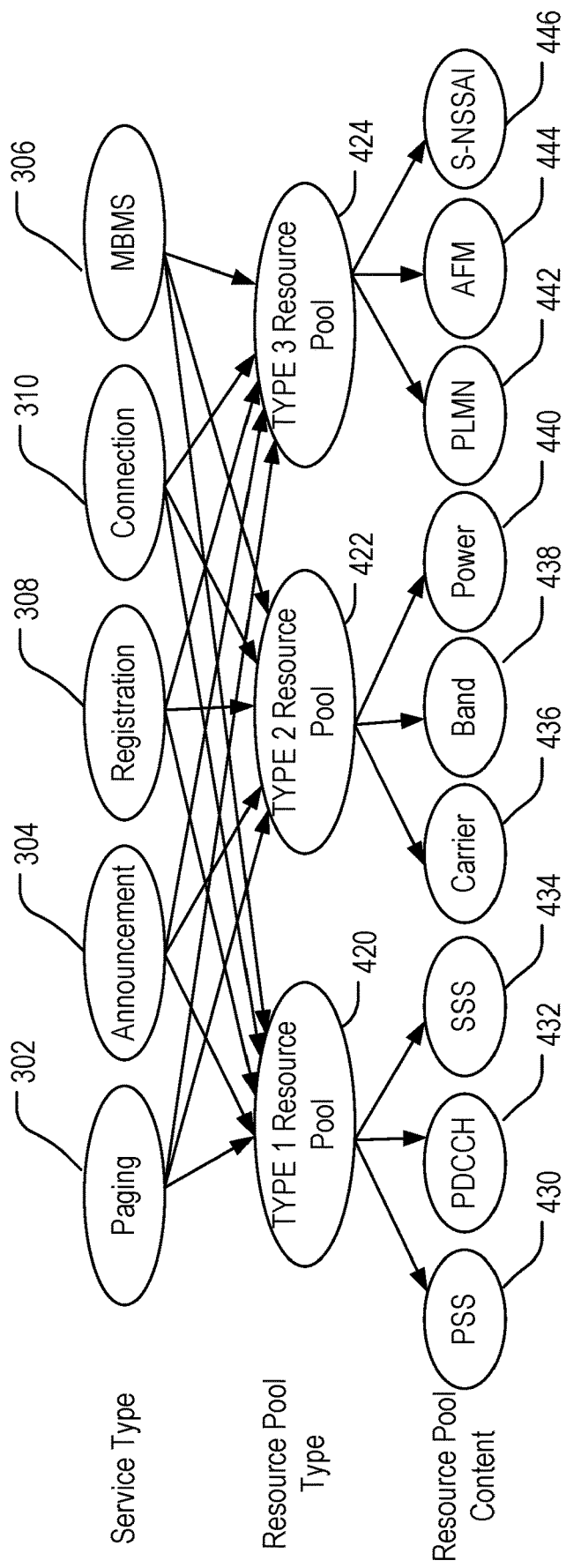
FIG. 4 shows another example scheme for specifying network resources for providing various types of network services.

As shown in FIG. 3, each service type such as paging service 302, announcement service 304, MBMS 306, network registration service 308, network connection service 310, and so on may be associated with one or more types of resource sets such as TYPE 1 resource set 320, TYPE 2 resource set 322, and TYPE 3 resource set 324. Each type (or level) of resource set may be further associated with various network resources for the network service. For example, a TYPE 1 resource set 320 may be associated with primary synchronization signal (PSS) resources 330, physical down- As further shown in the alternative implementation of FIG. 4, each service type such as paging service 302, announcement service 304, MBMS 306, network registration service 308, network connection service 310, and so on may be associated with one or more types of resource pools such as TYPE 1 resource pool 420, TYPE 2 resource pool 422, and TYPE 3 resource pool 424. Each type (or level) of resource pool may be further associated with various network resources for the network service. For example, a TYPE 1 resource pool 420 may be associated with PSS resource pool 430, PDCCH resource pool 432, SSS resource pool 434. For another example, a TYPE 2 resource pool 322 may be associated with carrier resource pool 436, frequency band resource pool 438, and power resource pool 440. For yet another example, TYPE 3 resource pool 424 may be associated with PLMN identity 442, AMF identifier 444, and S-NSSAI 446.

An example network service announcement message specifying resource pools associated with various services provided by a serving node is shown below:

---

Announcement name
{
  Announcement entity ID ;
  Service ID;
  resource pool ID;
  SS resource pool ID;
  SS resource ID;
  PDCCH resource pool ID;
  PDCCH resource ID;
  ......
}
registration name
{
  registration entity ID and version information;
  Service ID;
  resource pool ID;
  SS resource pool ID;
  SS resource ID;
  PDCCH resource pool ID;
  PDCCH resource ID;
  ......
}

---

Third Embodiment (Selecting from More than One Serving Nodes by a Served Node)

Multiple serving network nodes may transmit broadcast announcement messages to other network nodes. Such broadcast messages may be used to announce the various network services that are provided by each of the multiple serving network nodes. The multiple serving nodes may provide a same network service. Correspondingly, the other network nodes may receive the announcement messages from the multiple serving network nodes and obtain various information with respect to the services provided by the serving nodes. In particular, a served network node may obtain information with respect to a same network service provided by multiple serving network nodes.

As an example, each of the network service announcement messages broadcasted by the multiple serving network nodes and received by the served node may include at least one of:
  (1). A service identity list indicating service type the corresponding serving node can provide or support;
  (2). The service identity list indicating service types and service entities the serving node can provide or support; or
  (3). The resource sets for each service identity;

Further, a service type may indicate at least one network service category among a plurality of network service categories. In some implementations, the plurality of network service categories may include but are not limited to paging service, MBMS, network registration request service; network configuration request service; network connection request service, network registration response service, network configuration response service, network connection response service, announcement and discovery request service, and announcement and discovery response service.

The service entity information may be used to indicate identity information of the mobile network and the network node providing the network service. For example, the service entity information associated with a network service may include at least one of: a PLMN identity, an AMF identifier, an S-NSSAI, and a communication node identity.

The resource set component of the network service announcement by the serving node may include information related to network resources that are allocated or allocable for the corresponding network services. The network resources for various network services may include resources at various network levels. Accordingly, the resource sets for various network services may be classified into multiple types of resource sets, labeled as, for example, TYPE 1 resource sets, TYPE 2 resource sets, TYPE 3 resource sets, and so on. A particular service may be associated with one or more of the TYPE 1, TYPE 2, and/or TYPE 3 resource sets.

A TYPE 1 resource set, for example, may include physical channel/signal resource set such as SS resource set and PDSCH resource set. A TYPE 2 resource set may include an RF service related resource set such as radio spectrum, frame structure, and radio power. A TYPE 3 resource set may include a business operation resource set such as PLMN identity, AMF identifier, and S-NSSAI. The terms "TYPE 1", "TYPE 2," and "TYPE 3" are used merely as labels to differentiate the resource sets of different types or levels.

A serving network node may provide multiple categories of services. As such, the network service announcement message may include a list of multiple service identities and each service identity may be associated with a service entity and one or more resource sets of various types.

The multiple serving network nodes may provide a same particular network service with the service information included in their announcements of the particular network service.

Once the network service announcement messages from the multiple serving network nodes are received by the served network nodes, the served network node, when needing a particular network service, may then select a serving network node from serving network nodes that provide the particular network service according to the announcement messages. The resource sets for the particular network service as identified in the announcement message of the selected serving network node may be identified and used to request the particular network service from the selected serving network node. The network service request, for example, may be made via the service-based interface described above.

The served nodes may be a UE, a WANN (a base station) or another type of network node in the wireless network. The serving node, for example, may be a UE, a WANN, a service application, a data network, or another type of network node in the wireless network.

Fourth Embodiment (Serving Node)

A serving node that provide one or more network services may first construct a broadcast announcement message for announcing its service functions or capabilities to other network nodes, and then send the announcement message to the other network nodes via broadcast. The broadcast announcement message may include:
  (1). A service identity list indicating service types the serving node can provide or support; or
  (2). A service identity list indicating service types and service entities the serving node cannot provide or support; or (3). A list of service identity to add, indicating service types and/or entities of network services that the serving node can provide and can be added on top of previous announcement by the serving node; or (4). A list of service identities to release, indicating service types and/or entities of network services that were include in previous announcements by the serving node but are no longer provided.

A service type included in the announcement message for a service may indicate at least one network service category among a plurality of network service categories. In some implementations, the plurality of network service categories may include but are not limited to paging service, MBMS, network registration request service; network configuration request service; network connection request service, network registration response service, network configuration response service, network connection response service, announcement and discovery request service, and announcement and discovery response service.

The service entity information may be used to indicate identity information of the mobile network and the network node providing the network service. For example, the service entity information associated with a network service may include at least one of: a PLMN identity, an AMF identifier, an S-NSSAI, and a communication node identity.

The broadcast message from the serving node may further include resource set associated with each of the service identities. The resource set component of the network service announcement by the serving node may include information related to network resources that are allocated or allocable for the corresponding network services. The network resources for various network services may include resources at various network levels. Accordingly, the resource sets for various network services may be classified into multiple types of resource sets, labeled as, for example, TYPE 1 resource sets, TYPE 2 resource sets, TYPE 3 resource sets, and so on. A particular service may be associated with one or more of the TYPE 1, TYPE 2, and/or TYPE 3 resource sets.

A TYPE 1 resource set, for example, may include physical channel/signal resource set such as SS resource set and PDSCH resource set. A TYPE 2 resource set may include an RF service related resource set such as radio spectrum, frame structure, and radio power. A TYPE 3 resource set may include a business operation resource set such as PLMN identity, AMF identifier, and S-NSSAI. The terms "TYPE 1", "TYPE 2," and "TYPE 3" are used merely as labels to differentiate the resource sets of different types or levels.

Moreover, the broadcast message above may be segmented into multiple broadcast messages, with each of the multiple broadcast messages containing a segment of network service announcement by the serving node. As such, each segmented broadcast message may further include one or more of:

(1) A message segment, which carries a segment of the broadcast announcement message contents;

(2) A message segment number, which indicates a segment number of the broadcast message segment contained in this broadcast message, where, for example, a segment number of zero corresponds to the first segment, A segment number of one corresponds to the second segment, and so on; or (3) Message segment type, which indicates whether the included broadcast message segment is the last segment or not.

Fifth Embodiment (Relay of Network Service Broadcast Messages)

A serving network node may be configured to relay a network service broadcast announcement message from another serving network node. For example, the network serving node may first receive a first announcement message from another serving network node (which may be broadcasted unicasted by the other serving network node). The first announcement message may include:

(1). A service identity list indicating service types the other serving node can provide or support; or (2). A service identity list indicating service types and service entities the other serving node cannot provide or support; or (3). A list of service identities to add, indicating service types and/or entities of network services that the other serving node can provide and can be added on top of previous announcement by the serving node; or (4). A list of service identities to release, indicating service types and/or entities of network services that were include in previous announcements by the other serving node but are no longer provided.

A service type included in the announcement message for a service may indicate at least one network service category among a plurality of network service categories. In some implementations, the plurality of network service categories may include but are not limited to paging service, MBMS, network registration request service; network configuration request service; network connection request service, network registration response service, network configuration response service, network connection response service, announcement and discovery request service, and announcement and discovery response service.

The service entity information may be used to indicate identity information of the mobile network and the network node providing the network service. For example, the service entity information associated with a network service may include at least one of: a PLMN identity, an AMF identifier, an S-NSSAI, and a communication node identity.

Moreover, the first announcement message can further include resource set associated with each of the service identities. The resource set component of the network service announcement by the serving node may include information related to network resources that are allocated or allocable for the corresponding network services. The network resources for various network services may include resources at various network levels. Accordingly, the resource sets for various network services may be classified into multiple types of resource sets, labeled as, for example, TYPE 1 resource sets, TYPE 2 resource sets, TYPE 3 resource sets, and so on. A particular service may be associated with one or more of the TYPE 1, TYPE 2, and/or TYPE 3 resource sets.

A TYPE 1 resource set, for example, may include physical channel/signal resource set such as SS resource set and PDSCH resource set. A TYPE 2 resource set may include an RF service related resource set such as radio spectrum, frame structure, and radio power. A TYPE 3 resource set may include a business operation resource set such as PLMN identity, AMF identifier, and S-NSSAI. The terms "TYPE 1", "TYPE 2," and "TYPE 3" are used merely as labels to differentiate the resource sets of different types or levels.

Moreover, the first broadcast announcement message above may be segmented into multiple broadcast messages, with each of the multiple broadcast messages containing a segment of network service announcement by the serving node. As such, each segmented broadcast message may further include one or more of:
  (1) A message segment, which carries a segment of the broadcast announcement message contents;
  (2) A message segment number, which indicates a segment number of the broadcast message segment contained in this broadcast message, where, for example, a segment number of zero corresponds to the first segment, A segment number of one corresponds to the second segment, and so on; or
  (3) Message segment type, which indicates whether the included broadcast message segment is the last segment or not.

Once the serving network node receives the first announcement message from the other serving network node, the serving node may then send a second announcement message via broadcast to other network nodes. The second announcement message may include:
  (1). A service identity list indicating service type the serving node can provide or support; or
  (2). A service identity list indicating service type and service entity the serving node cannot provide or support; or
  (3). A list of service identity to add, indicating service type and/or entity of network services that the serving node can provide and can be added on top of previous announcement by the serving node; or
  (4). A list of service identity to release, indicating service type and/or entity of network services that were include in previous announcements by the serving node but are no longer provided.

The service type may indicate at least one network service category among a plurality of network service categories. In some implementations, the plurality of network service categories may include but are not limited to paging service, MBMS, network registration request service; network configuration request service; network connection request service, network registration response service, network configuration response service, network connection response service, announcement and discovery request service, and announcement and discovery response service.

The service entity information may be used to indicate identity information of the mobile network and the network node providing the network service. For example, the service entity information associated with a network service may include at least one of: a PLMN identity, an AMF identifier, an S-NSSAI, and a communication node identity.

Moreover, the second announcement message can further include resource set associated with each of the service identities. The resource set component of the network service announcement by the serving node may include information related to network resources that are allocated or allocable for the corresponding network services. The network resources for various network services may include resources at various network levels. Accordingly, the resource sets for various network services may be classified into multiple types of resource sets, labeled as, for example, TYPE 1 resource sets, TYPE 2 resource sets, TYPE 3 resource sets, and so on. A particular service may be associated with one or more the TYPE 1, TYPE 2, and/or TYPE 3 resource sets.

A TYPE 1 resource set, for example, may include physical channel/signal resource set such as SS resource set and PDSCH resource set. A TYPE 2 resource set may include an RF service related resource set such as radio spectrum, frame structure, and radio power. A TYPE 3 resource set may include a business operation resource set such as PLMN identity, AMF identifier, and S-NSSAI. The terms "TYPE 1", "TYPE 2," and "TYPE 3" are used merely as labels to differentiate the resource sets of different types or levels.

Moreover, the second broadcast announcement message above may be segmented into multiple broadcast messages, with each of the multiple broadcast messages containing a segment of network service announcement by the serving node. As such, each segmented broadcast message may further include one of:
  (1) A message segment, which carries a segment of the broadcast announcement message contents;
  (2) A message segment number, which indicates a segment number of the broadcast message segment contained in this broadcast message, where, for example, a segment number of zero corresponds to the first segment, A segment number of one corresponds to the second segment, and so on; or
  (3) Message segment type, which indicates whether the included broadcast message segment is the last segment or not.

The content of second announcement message may be the same as or different from the first announcement message. As such, the serving node may be used to relay the service capability of the other serving node to other network nodes.

Sixth Embodiment (Service Announcement Message as System Information Elements)

The service broadcast announcement message above may be constructed to include multiple system information elements. Different information elements can carry different system information items.

For example, the broadcast announcement message may include a first system information element. The first system information element may include:
  (1). A service identity list indicating service types the other serving node can provide or support; or
  (2). A service identity list indicating service types and service entities the other serving node cannot provide or support.

The broadcast announcement message may include a second system information element. The second system information element may include resource sets associated to each service identity. Furthermore, the resource set component of the network service announcement by the serving node may include information related to network resources that are allocated or allocable for the corresponding network services. The network resources for various network services may include resources at various network levels. Accordingly, the resource sets for various network services may be classified into multiple types of resource sets, labeled as, for example, TYPE 1 resource sets, TYPE 2 resource sets, TYPE 3 resource sets, and so on. A particular service may be associated with one or more the TYPE 1, TYPE 2, and/or TYPE 3 resource sets.

A TYPE 1 resource set, for example, may include physical channel/signal resource set such as SS resource set and PDSCH resource set. A TYPE 2 resource set may include an RF service related resource set such as radio spectrum, frame structure, and radio power. A TYPE 3 resource set may include a business operation resource set such as PLMN identity, AMF identifier, and S-NSSAI. The terms "TYPE 1", "TYPE 2," and "TYPE 3" are used merely as labels to differentiate the resource sets of different types or levels.

Moreover, the second system information element may further include one or more of:
(1). A service identity list indicating service types the other serving node can provide or support; or
(2). A service identity list indicating service types and service entities the other serving node cannot provide or support; or
(3). A list of service identities to add, indicating service types and/or entities of network services that the other serving node can provide and can be added on top of previous announcement by the serving node; or
(4). A list of service identities to release, indicating service types and/or entities of network services that were include in previous announcements by the other serving node but are no longer provided.

In some implementations, the network service announcement message above may be broadcasted using system information blocks (SIBs). In some example implementations, the first system information element above may be a master system information using master information block (MIB). In some implementations, the second system information element above may be a system information of type 1. In some example implementations, the first system information element above may be a system information block 1 (SIM). In some implementations, the second system information element above may be a system information block n (SIBn). Other manners in which system information blocks are used for the broadcast announcement message are contemplated.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for obtaining a network service by a network function, comprising:
receiving a network service announcement message from a first serving network function, wherein the network service announcement message comprises a service identity list of one or more network services provided by a second serving network function; and
selecting a target network service from the one or more network services,
wherein the service identity list further comprises at least one network resource set for each of the one or more network services, and
wherein the service identity list further comprises a resource type indicator for each of the at least one network resource set and for indicating one of physical channel/signal, spectrum/frame/power, or business operation resource type.

2. The method of claim 1, further comprising transmitting a service request for obtaining the selected target network service to the first serving network function based on the network service announcement message.

3. The method of claim 1, wherein the first serving network function is a same network function as the second serving network function.

4. The method of claim 1, wherein the service identity list comprises a service type for each of the one or more network services and wherein the service type comprises one of paging, multimedia broadcast multicast, network registration request, network configuration request, network connection request, network registration response, network connection response, announcement and discovery request, or announcement and discovery response service type.

5. The method of claim 1, wherein the service identity list further comprises a service entity for each of the one or more network services, wherein the service entity comprises one of a public land mobile network identity, an authentication management function identifier, a single network slice selection assistance information, or a communication node identity associated with each of the one or more network services.

6. The method of claim 1, further comprising transmitting a service request for obtaining the selected target network service to the first serving network function by:
selecting network resources from the network resource set corresponding to the selected target network service in the service identity list; and
transmitting the service request using the selected network resources.

7. The method of claim 1, wherein the network service announcement message is transmitted via one or more system information blocks.

8. The method of claim 1, further comprising transmitting a service request for obtaining the selected target network service to the first serving network function based on the network service announcement message via a service-based interface between network functions.

9. A method for announcing network services by a serving network function, comprising:
constructing a first network service announcement message comprising a service identity list of one or more network services provided by the serving network function; and
broadcasting the first network service announcement message to other network functions,
wherein the service identity list further comprises at least one network resource set for each of the one or more network services and the method further comprises receiving a service request for a target network service among the one or more network services transmitted by a served network function after the served network function receives the broadcasted first network service announcement message in network resources selected by the served network function from the network resource sets corresponding to the target network service according the service identity list.

10. The method of claim 9, wherein the service identity list comprises a service type for each of the one or more network services and wherein the service type comprises one of paging, multimedia broadcast multicast, network registration request, network configuration request, network connection request, network registration response, network connection response, announcement and discovery request, or announcement and discovery response service type.

11. The method of claim 9, wherein the service identity list further comprises a service entity for each of the one or more network services and wherein the service entity comprises one of a public land mobile network identity, an authentication management function identifier, a single network slice selection assistance information, or a communication node identity associated with each of the one or more network services.

12. The method of claim 9, wherein the service identity list further comprises a resource type indicator for each of the at least one network resource set and wherein the resource type indicator indicates one of physical channel/signal, spectrum/frame/power, or business operation resource type.

13. The method of claim 9, further comprising receiving a service request for a target network service among the one or more network services transmitted by a served network function after the served network function receives the broadcasted first network service announcement message via a service-based interface between network functions.

14. The method of claim 9, wherein the serving network function further receives a second network service announcement message from another serving network function prior to constructing the first network service announcement message and wherein the second network service announcement message comprises one of:
a service identity list indicating types or service identities of one or more network services provided by the other serving network function;
a service identity list indicating types or service identities of one or more network services not provided by the other serving network function;
a service identity add-list indicating types or service identities of one or more network services to be added as network services that are provided by the other serving network function; or
a service identity release-list indicating types or service identities of one or more network services to be removed as network service that were provided by the other serving network function.

15. The method of claim 14, wherein contents of the first network service announcement message and the second network service announcement message are the same.

16. A device comprising a processor and a memory, wherein the processor is configured to read computer code from the memory:
receive a network service announcement message from a first serving network function, wherein the network service announcement message comprises a service identity list of one or more network services provided by a second serving network function; and
select a target network service from the one or more network services,
wherein the service identity list further comprises at least one network resource set for each of the one or more network services, and
wherein the service identity list further comprises a resource type indicator for each of the at least one network resource set and for indicating one of physical channel/signal, spectrum/frame/power, or business operation resource type.

* * * * *